United States Patent [19]
Lonergan et al.

[11] Patent Number: 5,672,369
[45] Date of Patent: Sep. 30, 1997

[54] ALCOHOL AND POLYOL-CONTAINING DOUGHS AND METHOD OF MAKING

[75] Inventors: Dennis A. Lonergan, Medina; Peter S. Pesheck, Maple Grove; Patricia W. Hahn, Plymouth, all of Minn.

[73] Assignee: The Pillsbury Company, Minneapolis, Minn.

[21] Appl. No.: 477,216

[22] Filed: Jun. 7, 1995

[51] Int. Cl.⁶ .................... A21D 10/02; A21D 15/02
[52] U.S. Cl. .................... 426/128; 426/62; 426/94; 426/100; 426/113; 426/119; 426/124; 426/316; 426/324; 426/326; 426/335; 426/396; 426/410; 426/419; 426/532; 426/549; 426/556
[58] Field of Search ............... 426/549, 128, 426/113, 410, 94, 419, 396, 316, 119, 124, 551–555, 532, 324, 326, 335, 62, 556, 100

[56] References Cited

U.S. PATENT DOCUMENTS

| | | | |
|---|---|---|---|
| 3,208,855 | 9/1965 | Enoch et al. | 99/90 |
| 3,435,632 | 4/1969 | Fallin | 62/322 |
| 3,450,542 | 6/1969 | Badran | 99/154 |
| 3,894,155 | 7/1975 | Ono et al. | 426/25 |
| 4,335,584 | 6/1982 | Lermuzeaux | 62/388 |
| 4,366,178 | 12/1982 | Reynolds et al. | 426/393 |
| 4,374,151 | 2/1983 | Lindstrom et al. | 426/19 |
| 4,381,315 | 4/1983 | Yong et al. | 426/94 |
| 4,414,228 | 11/1983 | Nourigeon | 426/19 |
| 4,450,177 | 5/1984 | Larson et al. | 426/19 |
| 4,526,801 | 7/1985 | Atwell | 426/128 |
| 4,550,026 | 10/1985 | Ando | 426/316 |
| 4,743,452 | 5/1988 | Felske et al. | 426/19 |
| 4,847,104 | 7/1989 | Benjamin et al. | 426/549 |
| 5,094,859 | 3/1992 | Sluimer | 426/19 |
| 5,171,590 | 12/1992 | Sluimer | 426/19 |
| 5,314,702 | 5/1994 | Lewandowski et al. | 426/128 |
| 5,366,744 | 11/1994 | Drummond et al. | 426/128 |

FOREIGN PATENT DOCUMENTS

| | | | |
|---|---|---|---|
| 0620974 | 10/1994 | European Pat. Off. | A21D 6/00 |
| 2657827 | 6/1978 | Germany | B65B 55/18 |

*Primary Examiner*—Helen Pratt
*Attorney, Agent, or Firm*—Janal M. Kalis; Aleya Rahman

[57] ABSTRACT

A preproofed, uncooked dough is provided with improved storage stability. The dough product is packaged in a sealed package and stored at a temperature of less than about 45° (7° C.) and, if the package contains headspace, a substantial portion of the gas therein is the same as the leavening gas, carbon dioxide, and the dough also contains a polyol.

7 Claims, 9 Drawing Sheets

SYNERGY BETWEEN ETOH/GLYCEROL AND CO₂ PACKAGING
AVERAGE VALUES OVER 12 WEEKS OF SHELF LIFE

ALCOHOL AND POLYOL-CONTAINING DOUGHS AND METHOD OF MAKING

FIELD OF INVENTION

The present invention relates to preproofed uncooked dough products.

BACKGROUND OF THE INVENTION

In the making of bakery items, for example, bread, rolls, pastry, etc., a multi-step process is used. The process is labor and machinery-intensive and is also time-consuming. Dough can be formed in one of several conventional manners, for example, by the sponge method or the straight-dough method. In the sponge method, yeast, yeast food, water, some flour, and sucrose are mixed and then held to allow the yeast time to begin fermentation and to produce carbon dioxide and ethanol. Thereafter, remaining flour, some additional water, and minor dry ingredients are mixed with the preceding blend to form the dough, after which the dough is processed, for example, by sheeting or other known processing techniques. After forming the dough into its final form, the dough is proofed and then subsequently cooked, for example, by baking or frying. The sponge method of dough preparation is generally considered to be better because of better flavor and is considered the "standard" dough-making procedure. However, it takes longer than other dough-making procedures and the entire process, including proofing, can take up to eight hours.

Another dough manufacturing process is the straight-dough process. The straight-dough process includes the mixing all of the flour, minor dry ingredients, water, yeast food and yeast. The dough is mixed and fermented for 0 to 60 minutes (also known as "floor time"), readied for forming, cut and formed into the appropriate shape and then proofed. The advantage of the straight-dough method is that it is quicker than the sponge method and requires less equipment. It generally does not provide the same flavor and generally does not provide the same quality of cooked products. Even though the straight-dough method is quicker, it can take up to four hours to complete thorough proofing.

A third process of manufacturing dough is the continuous process. Typically, a pre-ferment, consisting of a fermented slurry of yeast, water, yeast food, and some sugar and flour, is combined with remaining dough ingredients, continuously mixed, cut into the appropriate size and shape and proofed. This particular method of dough manufacture is infrequently used because it is considered by the industry to produce a very low quality and very low-flavored product and is very equipment intensive.

The above processes have been used for a number of years, both in industry and in the home in simplified forms. As can be seen, the processes are equipment and time intensive. There has been a recent interest in providing fresh baked products, as is evidenced by the increased number of in-store bakeries. These bakeries provide fresher products than those delivered from a plant to the store. The time and equipment necessary to produce such products is somewhat prohibitive, however. It would, therefore, be desirable to eliminate the dough preparation and final proofing steps at the store, as discussed above, leaving it to the bakery to merely bake or otherwise cook the product. Likewise, it is desirable to eliminate the equipment and reduce the labor necessary to make a quality bakery item.

Attempts have been made to accomplish this goal in the past by freezing dough. However, product quality, such as texture, consistency and specific volume, have suffered because of the shipping and storage conditions, particularly freeze/thaw cycles of the dough. One attempt to solve problems with frozen breads is disclosed in U.S. Pat. No. 4,374,151. This patent relates to a use of a melting point depressant in a frozen, preproofed, uncooked bread dough. The expressed function of the melting point depressant in the frozen dough is to permit the dough to quickly soften in the oven as the temperature rises, permitting better oven spring during cooking. One of the described melting-point depressants was ethanol.

Another patent addressing frozen dough problems is European Patent Application 84308045.8, filed Nov. 20, 1984. This application relates to a method for producing yeast-leavened frozen pastry products which can be removed from the freezer and baked without the necessity of having to undergo further proofing or leavening. To eliminate the need for a lengthy thawing and proofing step prior to baking, the patent application described a slow freezing step.

SUMMARY OF THE INVENTION

The present invention includes a method for making a baked bread from a frozen dough. The baked bread has a specific volume substantially the same as bread made from an unfrozen dough. The method includes preparing a dough containing at least flour and water and sufficient leavening gas to provide a specific volume at storage temperature in excess of between about 1 to 2.5 cc per gram. The product is stored at a temperature that is less than about 45° F. (7° C.). Ethanol, glycerol or other alcohols or polyols are added to the dough in amount in a range of between about 1.5% and about 2% by weight of the dough. The dough is stored in a container. The container has a volume at least equal to the volume of the dough product. The container volume, in excess of the dough product contains about 95% by volume of carbon dioxide gas.

The present invention also includes a system of maximizing specific volume in a bread baked from frozen dough. The frozen dough has a matrix of gas cells defined by the dough. The system includes a dough wherein the dough includes a water component. The system also includes adding a quantity of ethanol, glycerol or other alcohol or polyol to the dough in a concentration effective to partially swell and/or solubilize proteins within the dough defining the gas cells, These swollen and solubilized proteins are believed to promote expansion of the gas cells, A quantity of carbon dioxide is contacted with the container in a quantity effective to minimize or reduce the escape of carbon dioxide from the dough when the water in the dough freezes, due to the insolubility of carbon dioxide in ice.

DETAILED DESCRIPTION OF PREFERRED EMBODIMENTS

The present invention is a method for making a bread from a frozen dough, the bread having a specific volume equivalent to or exceeding the specific volume of a bread made from unfrozen fresh dough. The method includes an addition of ethanol, glycerol or other alcohol or polyol to dough prior to freezing the dough. The method also includes packaging the dough in an atmosphere containing carbon dioxide in order to substantially minimize or reduce the escape of carbon dioxide from the dough when the dough is frozen.

One of the significant problems encountered with the use of frozen, preproofed, uncooked doughs is the reduction of specific volume when the product is baked. Thus, when the dough item is cooked, its volume is significantly reduced, particularly if the product has been through one or more freeze/thaw cycles, as compared to a product baked from a freshly made dough. The method of the present invention overcomes this problem by a use of ethanol, glycerol or other alcohol or polyol and a controlled carbon dioxide environment surrounding the dough during storage. The method of the present invention is also usable to make a wide range of dough products, including breads and pastries, and can be used with laminated and non-laminated doughs. It has been found that by using a prescribed carbon dioxide gaseous environment, a quality improvement with storage time can be achieved and the use of ethanol, glycerol or other alcohol or polyol in the dough can improve product performance after storage time. Further, by the use of both the prescribed carbon dioxide environment and ethanol, a synergistic effect in product performance is achieved. In particular, bread doughs subjected to storage with carbon dioxide and treatment with a alcohol such as ethanol or a polyol such as glycerol have a specific volume that is synergistically greater than the sum of specific volumes of bread doughs subjected to either the carbon dioxide treatment or specific volume of bread dough subjected to the ethanol treatment.

Figure 9:
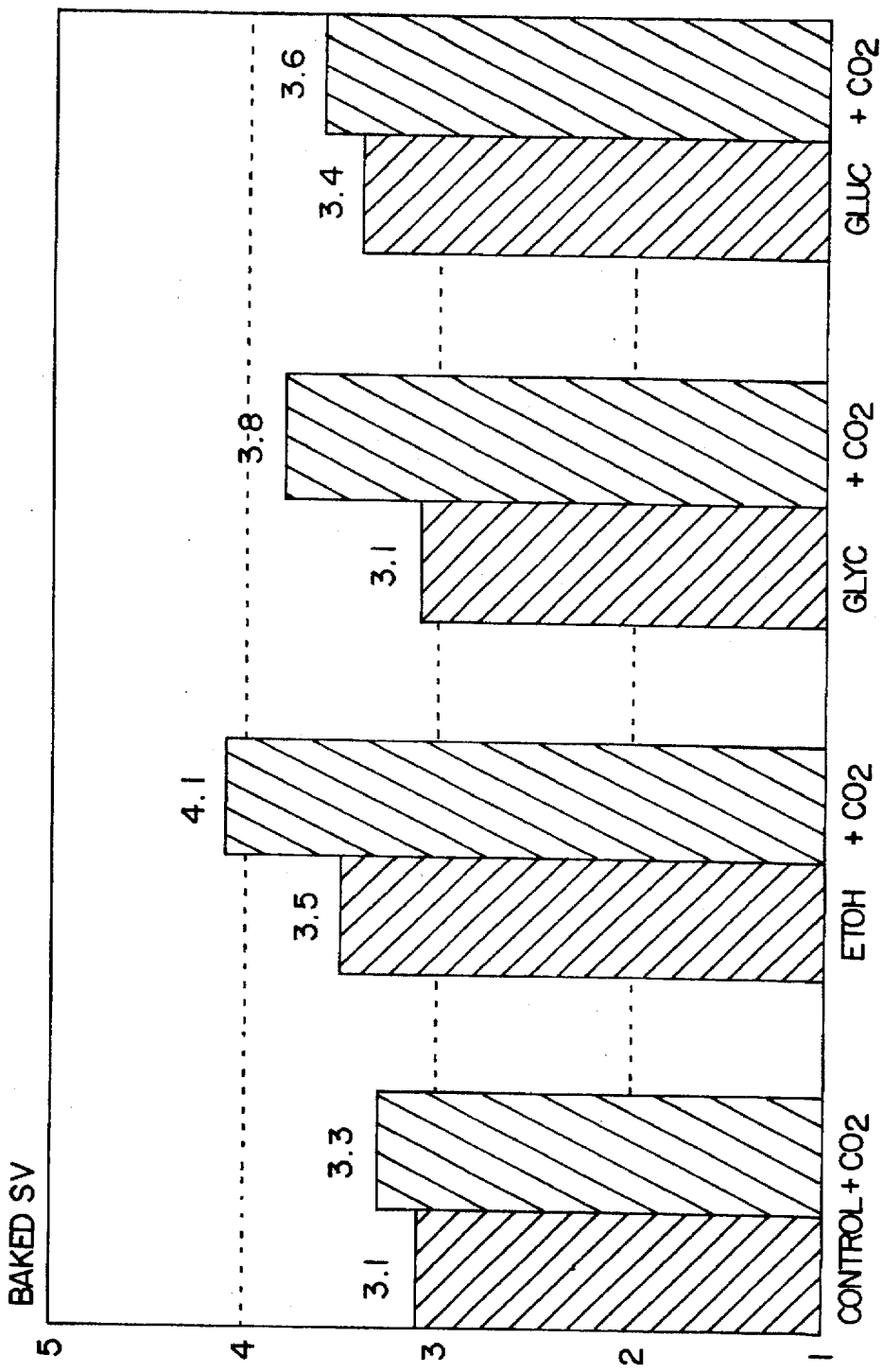
FIG. 9 is a graphical illustration of a synergistic effect of a combination of ethanol or glycerol added to bread dough and carbon dioxide on specific volume of baked bread made from the dough.

This synergistic effect is quantified and shown graphically in FIG. 9. The dough tested to obtain data shown in FIG. 9 included added ethanol in one test sample and glycerol in another test sample and was packaged in a carbon dioxide environment. The dough was stored in the carbon dioxide environment for at least twelve weeks. The specific volume (sv) was measured as cc/gram of bread.

The first two bars of the bar graph in FIG. 9 show an increase in specific volume of 0.2 when the bread dough was stored in carbon dioxide. The value, 0.2, is the difference between the specific volume of dough stored in carbon dioxide and the specific volume of dough stored without the carbon dioxide, the control. The doughs represented in the first two bars do not include "exogenous" or added ethanol.

The seventh and eighth bars include added glucose in the seventh bar and added carbon dioxide in the eighth bar. The difference in specific volume between doughs represented in bars seven and eight is 0.2. This difference is the same as the control bar. Thus, the addition of added glucose does not have an additive effect on increasing specific volume.

The third bar shows the specific volume of a dough containing ethanol but not stored in a carbon dioxide environment. The fourth bar shows the specific volume of a dough containing ethanol and stored in carbon dioxide. The difference in specific volumes is 0.60 cc/gm which is 4.1–3.5. Based upon the performance of dough stored with carbon dioxide, the second bar, the expected difference between bars three and four is 0.20. Thus, the additional 0.40 cc/gm are an unexpected, 66% synergistic increase in specific volume of bread dough made with added ethanol and stored in a carbon dioxide environment.

The fifth bar in FIG. 9 shows the specific volume of a bread dough to which glycerol has been added. The sixth bar shows the specific volume of a bread dough made with added glycerol and stored with carbon dioxide. The difference in specific volumes is 0.7 (3.8–3.1). The additional 0.5 cc/gm (0.7–0.20) is an unexpected, synergistic increase in specific volume of bread dough made with added glycerol and stored in a carbon dioxide environment.

A dough for use in the method of the present invention can be formed in any suitable manner such as described above by the sponge method, the straight-dough method, or the continuous dough method, as is known in the art. The particular formula for the dough will be dictated by the resulting end product. It can range anywhere from a bread to pastry. Breads have fat contents of 0% fat to about 6% fat and pastries generally have a fat content of 6% to about 30% by weight of the dough.

Generally, flour is present in an amount in a range of between about 50% and about 60% by weight of dough, water in an amount of between about 30% and about 40% by weight of dough, sugar in an amount in a range of between 2% and about 8%. Other dry minor ingredients, such as dough conditioners and salt may be present. Depending upon the type of leavening desired, either a chemical leavener that produces carbon dioxide by a reaction between, for example, sodium bicarbonate and glucono-delta-lactone, or yeast can be added to the dough to provide the desired production of carbon dioxide to leaven the dough. Typically, chemical leaveners are in an amount in a range of between about 2% and about 5% and yeast is added in an amount in a range of between about 0% and about 6% by weight of the dough. The foregoing percentages are by weight of the dough as mixed. Ethanol is also produced in yeast leavened doughs during proofing and generally is present in an amount in a range of between about 0.5% and about 2% by weight of the dough as proofed when yeast is used as the leavener. The other ingredients generally remain about the same in their relative proportions as described above.

In one embodiment, edible ethanol is be added to yeast leavened doughs in the range of between about 0.5% and about 3% so that the total ethanol concentration is in a range of between about 1% and about 5% of bread weight.

During cooking, the dough loses some of the volatilizable components, such as ethanol, and other liquid components, including water, that evaporate at the cooking temperature. Typically, water loss is in a range of between about 10% to about 12% of the total water during cooking. If the product is fried, water will be lost, but there will be some fat pickup. The final fat content depends upon the amount of initial fat added to the product. During cooking, the ethanol is substantially lost through vaporization. The cooking temperature is in the range of between about 325° F. (163° C.) and about 400° F. (205° C.) for baking and is in the range of between about 350° F. (175° C.) and about 400° F. (205° C.) for frying.

As described above, the dough is prepared preferably by either the sponge method or the straight-dough method. The dough is mixed in a suitable mixer and is developed preferably to peak development as is known in the industry. The dough may optionally be sheeted or laminated. A particularly good sheeting line is Seewer Rondo. After sheeting and laminating, if desired, the product is cut and/or formed into a desired shape as is known. These formed pieces are then proofed preferably at a relative humidity in a range of between about 60% and about 90% at a temperature in a range of between about 75° F. (24° C.) and about 105° F. (41° C.) or preferably in a range of between about 80° F. (27° C.) and about 95° F. (35° C.). Proofing is conducted until the proper degree of proofing is obtained, which can be measured by the volumetric rise of the dough. Generally, this volumetric rise is in a range of about 150% and about 300% of the original volume of the cut dough piece or, preferably, in a range of between about 175% and about 275% and most preferably in a range of between about 200% and about 250%.

The proofed pieces of dough are then cooled to their appropriate storage temperature, and then packaged in suitable packaging. Preferably, the storage temperature is below about 45° F. (7° C.). The temperature is in a range of between about 33° F. (1° C.) and about 45° F. (7° C.) for refrigerated distribution of the product. For frozen distribution, i.e., a temperature of less than 32° F. (0° C.), the preferred storage temperature is in the range of between about −60° F. (−51° C.) and about 20° F. (−7° C.), preferably in a range of between about −40° F. (−40° C.) and about 10° F. (−12° C.) and most preferably is in a range of between about −10° F. (−23° C.) and about 0° F. (−18° C.). Storage temperature will vary throughout storage time. It is preferred that these temperatures be maintained for at least a majority and preferably at least about 90% of the time the product is stored.

The dough should have a specific volume of at least about 1.0 to 2.5 cc per gm just prior to storage.

The dough product can be cooled before or after it is placed in suitable packaging. Preferred packaging includes hermetically-sealed packages with the packages being made of materials having suitable barrier properties to retain a gaseous carbon dioxide environment therein over the expected shelf life of the product. It is preferred that the package volume be in excess of the dough product volume contained therein. If there is any excess volume, commonly referred to as headspace, it should contain at least about 50% by volume of carbon dioxide. Preferably, the headspace contains about 100% carbon dioxide. The carbon dioxide gas can be added by gas flushing of the package as is known.

It has been found that by use of ethanol, glycerol or other alcohol or polyol in the product that an improvement in baked specific volume can be achieved after extended frozen storage. It was also found that the use of the prescribed carbon dioxide environment surrounding the dough during storage would also result in an increased baked specific volume after storage time. Surprisingly, as discussed, it was found that the combination of the two provided a synergistic effect by producing exceptional baked specific volume with extended storage times.

It is believed that the added ethanol, glycerol and other alcohols or polyols partially swell and/or solubilize proteins in the dough. These swollen and solubilized proteins act to modify the viscoelastic behavior of the dough lamella between gas cells and, by adsorption to and unfolding at the gas cell/dough interface, reduce the surface tension at the gas cell wall.

To understand the effect of modifying the viscoelastic behavior of the dough, dough can be characterized as a matrix of gas cells. Each gas cell is defined by the dough. "Gas" in the gas cell as most leavening reactions proceed is mainly carbon dioxide. The size of any given gas cell depends upon the degree and rate of carbon dioxide production that occurs within the dough as well as upon the viscoelastic properties of the dough defining each individual gas cell. If the viscoelastic properties of the dough are modified such that the gas cells can more easily expand, a dough having larger gas cells, hence a greater specific volume, will result.

Surface tension at the gas cell wall is believed to be an important contributor to baking performance. The carbon dioxide generated by the leavening agents in the dough creates pressure in the gas cell against the gas cell walls. It is believed that proteins present in dough undergo a degree of unfolding and denaturation at the gas cell/dough interface, resulting in lower surface tension. When the surface tension is lower, less pressure is required to expand gas cells in the dough and higher baked specific volumes result. It is believed that one function of ethanol, glycerol, or other alcohols or polyols in dough is to partially swell and/or dissolve dough proteins to a greater degree than that which occurs in the absence of added alcohols or polyols. These swelled and/or dissolved proteins become more available for adsorption to and partial denaturation at the dough/gas cell interface, further lowering the surface tension and decreasing the pressure required to expand gas cells throughout the dough. It is believed that this relationship permits the gas cells to expand dramatically in the presence of ethanol, glycerol or other alcohols or polyols added to the dough.

Once the dough has been proofed and as the dough cools, carbon dioxide solubility in the aqueous phase of dough increases. Carbon dioxide has a tendency then, to dissolve in the dough until the freezable water in the dough changes to ice. Once this physical change occurs, all of the carbon dioxide that was dissolved in that water will be abruptly released. In a conventional packaged dough, this carbon dioxide will escape from the dough. By packaging the dough in an environment flushed with carbon dioxide, an equilibrium is created such that the tendency for carbon dioxide to escape from the dough is reduced. Once the water in the dough freezes, the carbon dioxide released from freezing water will therefore remain dissolved in the dough during storage.

Figure 4:
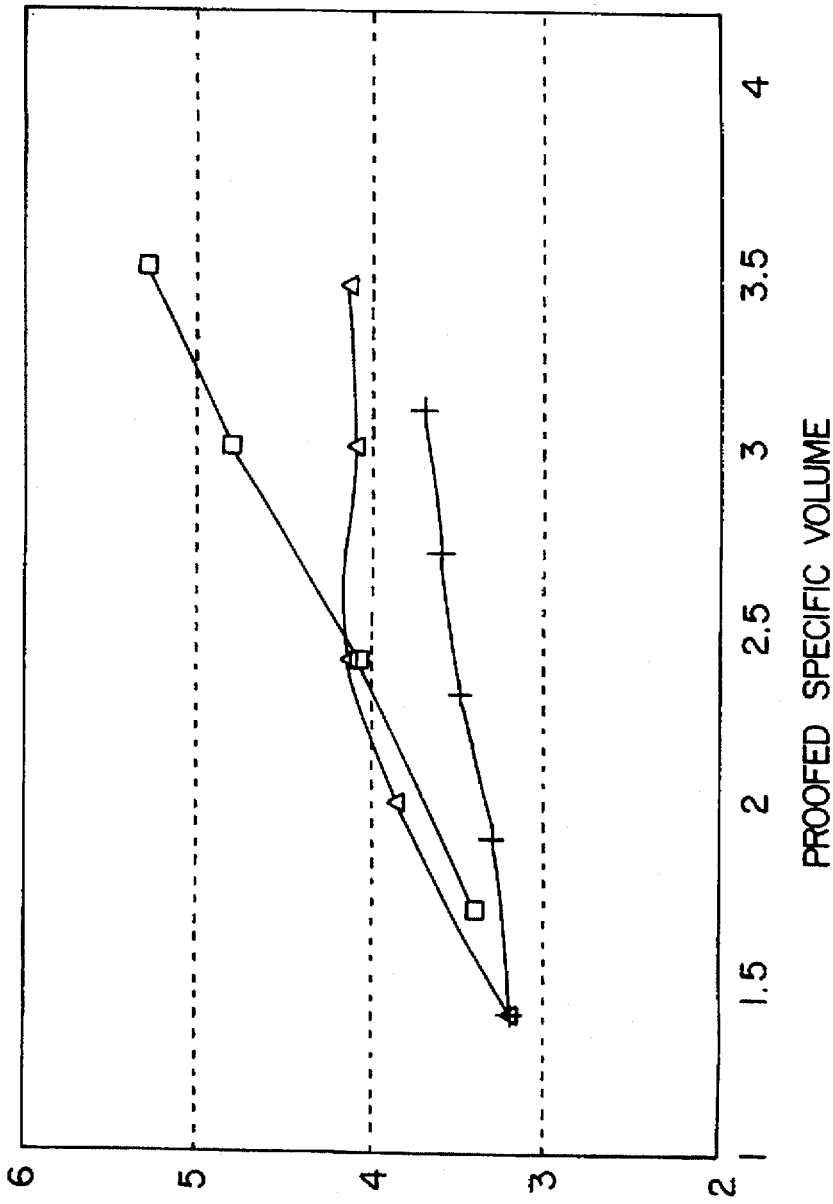
FIG. 4 is a graph showing functional relationships between baked specific volume and proofed specific volume for doughs containing 1.5 wt-% ethanol and frozen in environments containing air or carbon dioxide.

The effect on baked specific volume of ethanol addition to a dough as a function of proofed (unbaked) specific volume is shown graphically in FIG. 4. Proofed specific volume is the specific volume of the raw dough. In commercial dough manufacture, it is desirable to produce doughs with lower proofed specific volumes as lower specific volumes are more tolerant to physical disturbance, such as during shipping—in other words, low proofed specific volume doughs are less fragile. Also shown in FIG. 4 are baked specific volumes for products baked from fresh dough containing 1.5 wt-% ethanol, frozen dough containing 1.5 wt-% ethanol and packed in an air environment, and frozen dough containing 1.5 wt-% ethanol packed in a carbon dioxide environment. Desirably, the slope of the frozen dough containing added ethanol and stored in a carbon dioxide atmosphere has a slope that more closely approximates the fresh dough specific volume slope relationship, surprisingly even when the frozen dough started with a proofed specific volume lower than the proofed specific volume of the fresh dough. This means that it is possible to start with lower proofed specific volumes, as is desired particularly for commercial dough manufacture, and still attain baked specific volumes similar to those of freshly made baked dough products.

Figure 8:
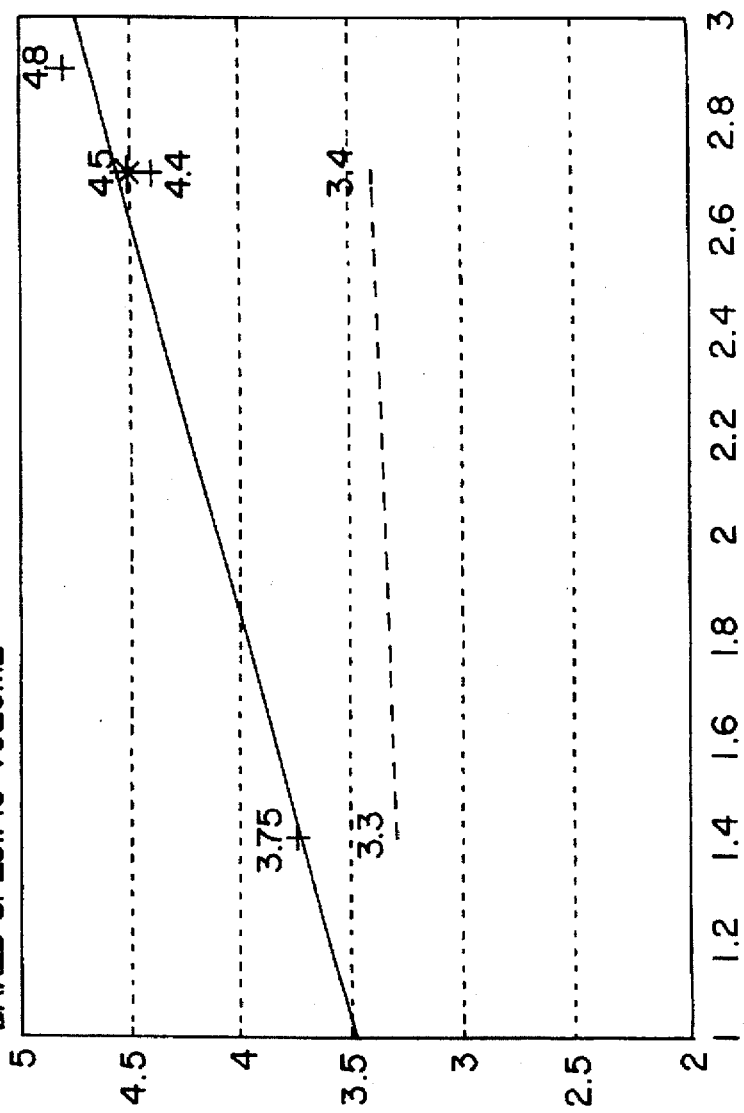
FIG. 8 is a graphical illustration of a relationship between baked specific volume of bread and proofed specific volume of dough containing a heat activated leavening system.

In addition to the leavening agents described previously, it has been found that the use of special hybrid leavening systems in the present invention provides additional improvement of baked specific volume in the final product. For instance, by adding a heat-activated leavening agent such as dimagnesium phosphate in combination with baking soda in an ethanol-containing dough, it was observed that the relationship between the proofed specific volume and baked specific volume in frozen doughs could be made to approximate the same relationship in a freshly baked dough product. This means that by using heat-activated leavening agents alone or in combination with other leavening agents, a high baked specific volume can be obtained from even lower proofed specific volumes than in doughs containing conventional leavening agents. As shown in FIG. 8, for instance, by adding dimagnesium phosphate in a concentration of about 0.665% by dough weight and soda in a concentration of 0.226% by weight to a dough that also included 1.5% of ethanol by weight, resulted in a baked product specific volume higher than frozen dough containing ethanol and conventional leavening agents, and was even able to attain the baked specific volume of a product baked from a fresh, unfrozen dough containing ethanol.

Improved performance is demonstrated by the following examples which illustrate, but do not limit this invention.

EXAMPLE 1

Yeast Leavened Bread

This example shows the ability of carbon dioxide or combinations of carbon dioxide and ethanol to extend the shelf life quality of yeast leavened, low fat, proofed, frozen dough structures. 50 pound batches of bread doughs were prepared using the ingredients and formulations shown in Table I. The process is described below:

TABLE I

| INGREDIENT | PERCENT BY WEIGHT | | | |
|---|---|---|---|---|
| | A | B | C | D |
| Flour, hard, high gluten untreated | 58.780 | 58.710 | 58.750 | 58.750 |
| Water, 32° F.–40° F. (0° C.– 4° C.) | 21.350 | 20.420 | 19.880 | 18.380 |
| Ice, crushed | 7.690 | 7.690 | 7.690 | 7.690 |
| Dextrose | 2.000 | 2.000 | 2.000 | 2.000 |
| Salt | 1.200 | 1.200 | 1.200 | 1.200 |
| Potassium bromate | 0.080 | 0.080 | 0.080 | 0.080 |
| Flour enrichment | 0.008 | 0.008 | 0.008 | 0.008 |
| Ascorbic acid | 0.002 | 0.002 | 0.002 | 0.002 |
| Ethanol | 0.000 | 1.000 | 1.500 | 3.000 |
| Water, 105° F.–110° F. (40° C.–43° C.) | 7.690 | 7.690 | 7.690 | 7.690 |
| Yeast, active dry | 1.200 | 1.200 | 1.200 | 1.200 |
| | 100.000 | 100.000 | 100.000 | 100.000 |

A hydrated yeast slurry was prepared by combining the active dry yeast and 105° F.–110° F. (40° C.–43° C.) water, and stirring the combination for 10–15 minutes using any suitable low shear mixer. This hydrated yeast slurry was used within 15 minutes of its preparation.

The hydrated yeast slurry and all remaining ingredients were placed in the bowl of a dough mixer such as the J. H. Day Mixer Model 30842. The ingredients were mixed at "low" speed for about 30 seconds, and then at "medium" speed for about four minutes to form a typical bread dough.

A dough structure was formed using methods well known in the baking industry. About 15 pounds of dough were placed on the belt of a Seewer Rondo Model 55063 sheeter. The dough surface was lightly dusted with flour, and passed through the rolls of the sheeter to form a uniform dough sheet, or pad, approximately 7 mm thick. The pad was folded upon itself two times, and again reduced to a 7 mm thickness. The resulting dough pad was again folded upon itself two times, and reduced to 7 mm thickness. The final dough pad consisted of about 16 layers of dough. The dough pad was cut into rectangularly shaped pieces each about 4 inches by 7 inches and weighing 200 grams. The surface of each dough piece was lightly sprayed with water and, starting with the narrow end, rolled into a cylinder form. The dough cylinders were placed in standard 2.75 inch×5.5 inch loaf shaped Ekco brand aluminum foil baking pans, and proofed at 95° F. (35° C.) and 75% relative humidity. All doughs were proofed to a given specific volume of about 2.5 cc/gm. The actual proofing time depended on the dough's ethanol content and ranged from about two hours (for 0% ethanol) to about six hours (for 3% ethanol).

Following proofing, the dough was stored for about 1½ hours in a mechanical freezer maintained at an ambient temperature of about −10° F. (−23° C.). Freezing the dough in this manner arrested further yeast metabolism and also prevented deformation of the fragile dough structures.

The frozen dough structures were packaged in a gaseous atmosphere of the following composition:
A. 99% Carbon Dioxide and 1% Air
B. 75% Carbon Dioxide and 25% Air
C. 50% Carbon Dioxide and 50% Air
D. 0% Carbon Dioxide and 100% Air (Control)

Each dough structure was placed into a 10 inch×12 inch pouch constructed of a material which was essentially impervious to gases. An example of a suitable pouch material is a laminated film constructed of 1 mil Nylon, a Saran emulsion polymer, and 2 mil Surlyn. The pouches containing the frozen dough structure were sealed except for an opening along one edge. A specific storage gas or gas mixture was injected into a pouch by inserting a nozzle through this opening. Each gas or gas mixture was injected into and then expelled from the pouch three times, and then injected a fourth and final time before sealing the opening. This procedure helped assure that the experiment gas or gas mixture had displaced the atmospheric gases originally in the pouch. Residual oxygen in each pouch was measured after packaging and prior to each product evaluation using a Mo-Con LC-700F oxygen analyzer (Modern Controls, Inc., Elk River, Minn.) in order to monitor the integrity of each pouch.

The gas packaged dough structures were stored in a freezer maintained at an ambient temperature of about 0° F. (−18° C.). Samples of each experimental variable were evaluated immediately before freezing, after freezing, and thereafter, at two or three week intervals as follows: The bread doughs in their foil loaf pans were removed from their pouches, placed on a metal baking tray, and baked in a convection oven (Despatch Model SS-7) at 375° F. for 33–37 minutes. The specific volume and sensory quality of each bread was measured.

Figure 1:
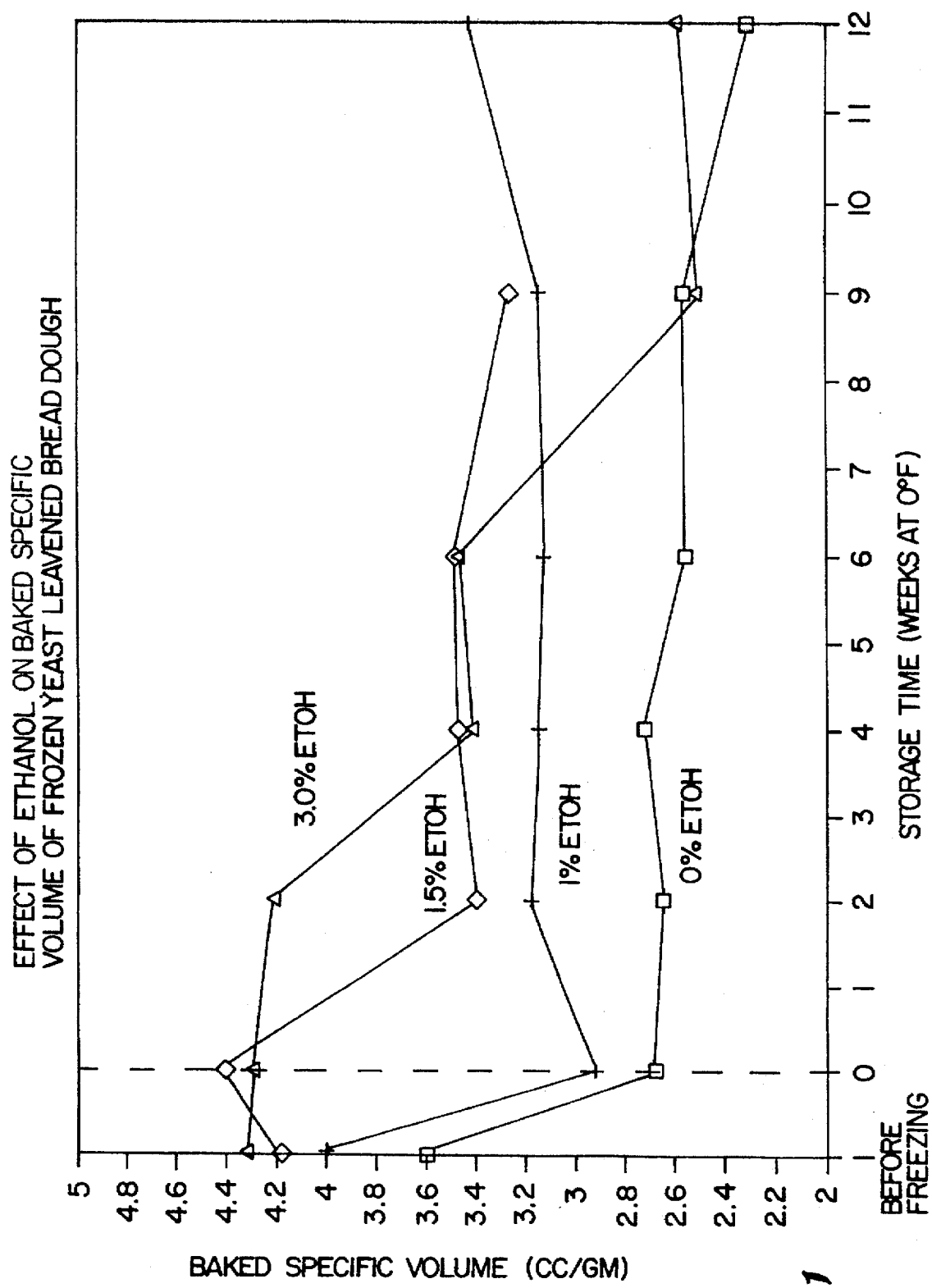
FIG. 1 is a graph showing functional relationships between baked specific volume and storage times for different levels of ethanol.
Figure 2:
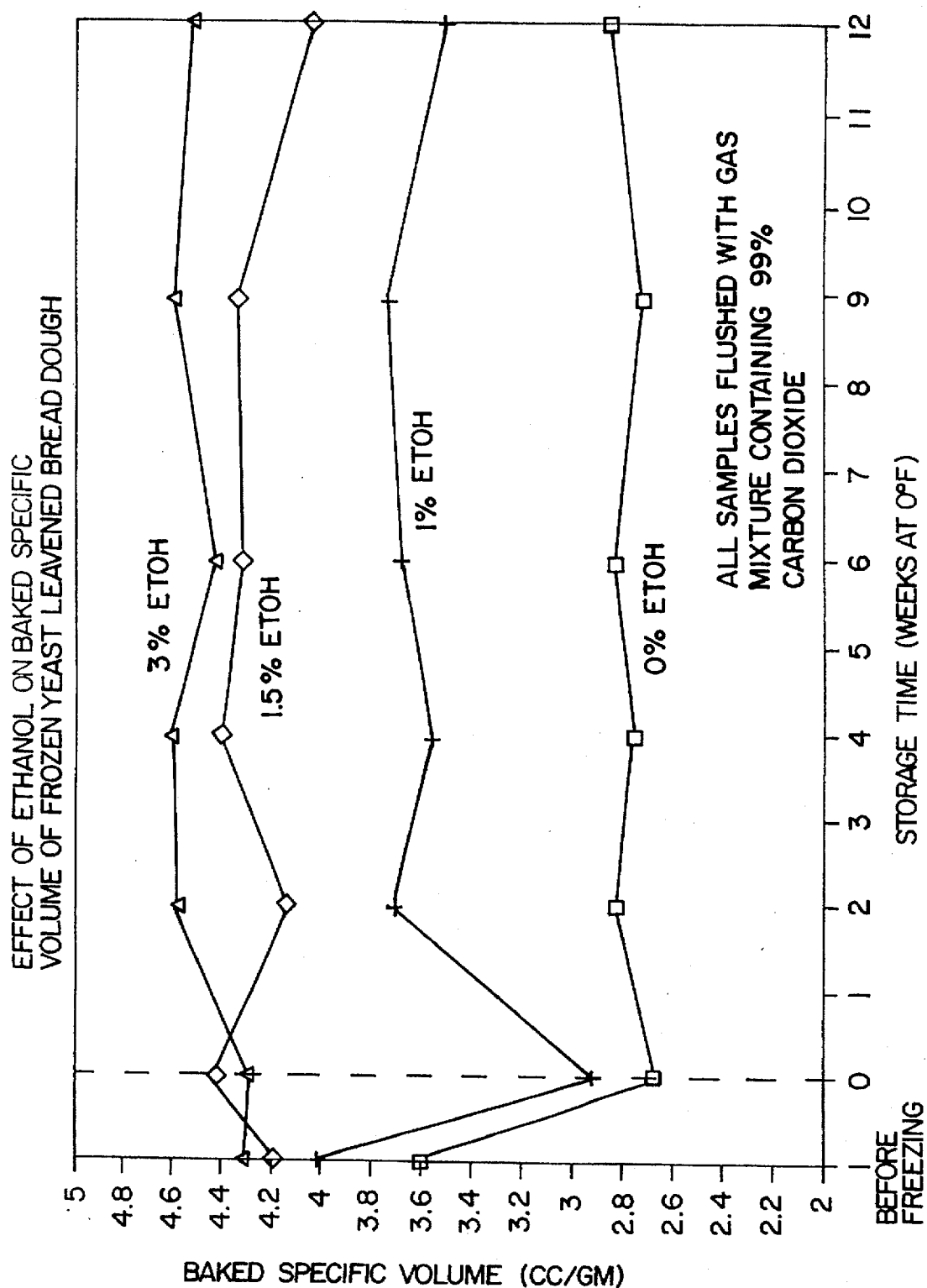
FIG. 2 is a graph showing functional relationships between baked specific volume and storage times for different levels of ethanol and with a package being flushed with a gas containing 99% carbon dioxide.
Figure 3:
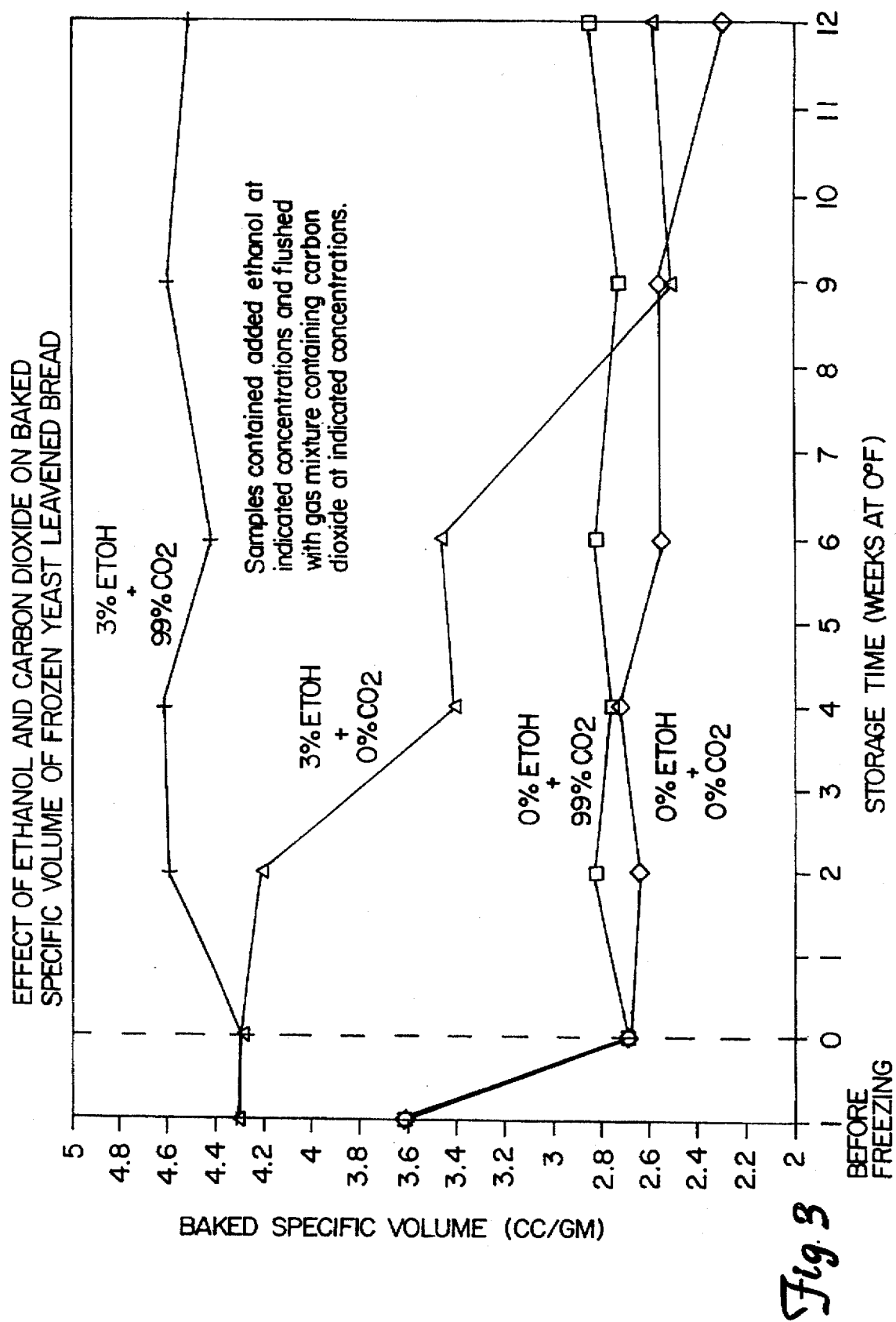
FIG. 3 is a graph showing functional relationships between baked specific volume and storage times showing different levels of ethanol and carbon dioxide.
Figure 5:
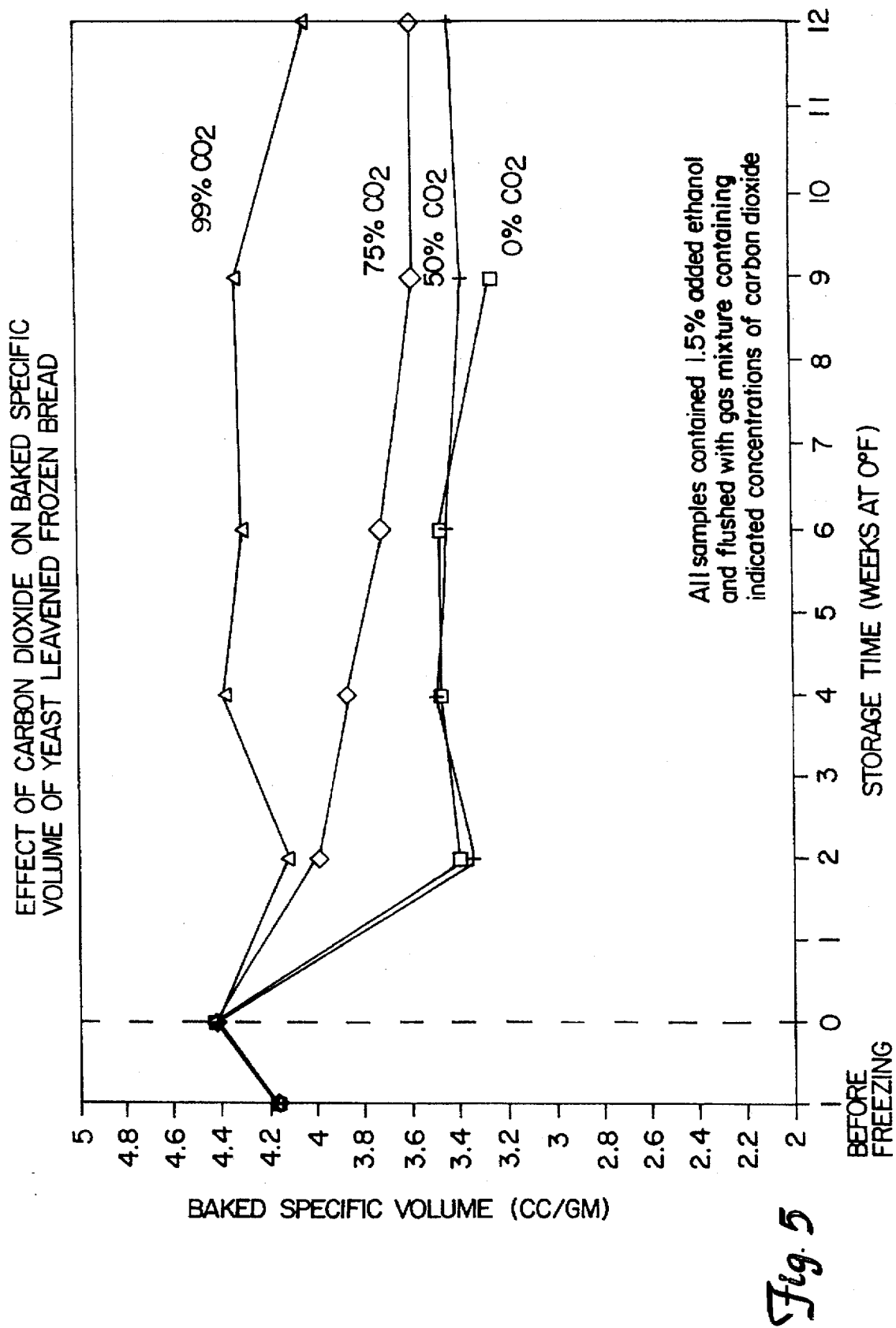
FIG. 5 is a graph showing functional relationships among baked specific volumes for products stored in containers having different carbon dioxide levels with the products each having 1.5% added ethanol.

As shown in FIG. 1, added ethanol above about 1.5% prevented loss of bread baked specific volume following freezing; however the products lost specific volume continuously throughout storage time. In addition to the marked drop in specific volume, the products developed an unacceptable gummy consistency. In contrast, as shown in FIG. 2, product containing 1.5% to 3.0% ethanol and packed in a gas mixture containing 99% carbon dioxide retained a high specific volume throughout shelf life. These products were of excellent quality. FIG. 3 illustrates an unexpected synergistic effect between ethanol and carbon dioxide treatments. Samples which contained added ethanol and were packed in a carbon dioxide flushed container maintained outstanding quality throughout 12 weeks storage. This quality was greater than that predicted from the storage data of products made with only added ethanol or carbon dioxide. FIG. 5 shows the effect of the flushing gas carbon dioxide concentration on bread specific volume. The desired extension of shelf life quality was achieved with gas mixtures containing more than about 50% carbon dioxide.

EXAMPLE 2

Yeast Leavened Croissant

The following example demonstrated the application of this invention to a high fat, laminated, and yeast leavened dough structure such as a croissant. A 50 pound batch of dough was prepared using the ingredients and formula shown in Table II and the process described below.

TABLE II

| YEAST LEAVENED CROISSANT DOUGH PAD FORMULA | |
|---|---|
| INGREDIENT | PERCENT BY WEIGHT |
| Flour, hard, high gluten, untreated | 53.870 |
| Water, 32° F.–40° F. (0° C.–4° C.) | 10.980 |
| Ice, crushed | 7.690 |
| Sucrose | 4.000 |
| Butter, unsalted, 40° F. (4° C.) | 3.000 |
| Dextrose | 2.000 |
| Egg, whole dry | 1.600 |
| Milk, nonfat dry | 1.600 |
| Ethanol | 1.500 |
| Salt | 1.000 |
| Yeast food | 0.280 |
| Potassium bromate | 0.080 |
| Flour enrichment | 0.008 |
| Ascorbic acid | 0.002 |
| Water, 105° F.–110° F. (40° C.–43° C. | 10.690 |
| Yeast, active dry | 1.700 |
| | 100.000 |

Butter pads were prepared by passing butter stored at 45° F.–54° F. (7° C.–12° C.) through the colander attachment of the Model 300-D Hobart mixer. Approximately 1000 gm quantities of this plasticized butter were molded into 1 cm×30 cm×30 cm pads using a Rondo Model SS063 sheeter. The butter pads were maintained at 45° F.–54° F. (7° C.–12° C.) until use.

A hydrated yeast slurry was prepared as described in Example 1.

Dough pads were prepared as follows: The remaining dry ingredients and butter were mixed for about one minute in a J. H. Day Model 30842 mixer. The hydrated slurry, water, crushed ice, and ethanol were added to the mixer containing the previously blended dry ingredients. The contents of the mixer were blended at "low" speed for 30 seconds, and then at "medium" speed for 4.5 minutes. The resulting dough was divided into 3000 gm pieces. Each piece was reduced to a pad approximately 0.8 cm×35 cm×60 cm using a Rondo Model SS063 sheeter, and placed in a 0° F. (−18° C.) refrigerator for about 20 minutes or until the dough pad temperature was reduced to 45° F.–54° F. (7+ C.–12° C.).

Laminated dough sheets were prepared from the above butter pads and dough pads. The butter pad was centered on top of the dough pad. The ends of the dough pad were folded over the top of the butter pad such that the ends met at the center of the butter pad. Next, the dough enrobed butter structure was sheeted to a thickness of 10 mm. The structure was folded upon itself twice, and again sheeted to 10 mm thickness. The previous step was repeated three times. Finally the structure was folded upon itself once, and sheeted to a thickness of 2.75 mm. The resulting laminated dough sheet contained about 64 distinct butter layers.

Individual croissant dough pieces were immediately fabricated from the laminated dough structure. Triangle-shaped sections, each weighing 80 gms, were cut from the laminated dough sheet. Starting at the base of the triangle, each dough triangle was rolled into the shape of a typical croissant. The croissants were proofed at 90° F. (32° C.) and 75% relative humidity until each dough piece attained a maximum height of two inches. The proofed croissants were placed into a −40° F.(−40° C.) freezer for about 1½ hours or until firm before final packaging.

The frozen croissants were packaged in atmospheres of 99%–100% carbon dioxide, nitrogen, nitrous oxide, and helium using the packaging material and procedure described in Example I, and stored at 0° F. (−18° C.).

The croissants were evaluated before freezing, after freezing, and, thereafter, at 2–3 week intervals. The croissants were removed from their pouches, placed on a metal baking tray, and baked in a convection oven (Despatch Model SS-7) at 375° F. (188° C.) for 25–30 minutes. The specific volume and sensory qualities of each croissant were measured.

Figure 6:
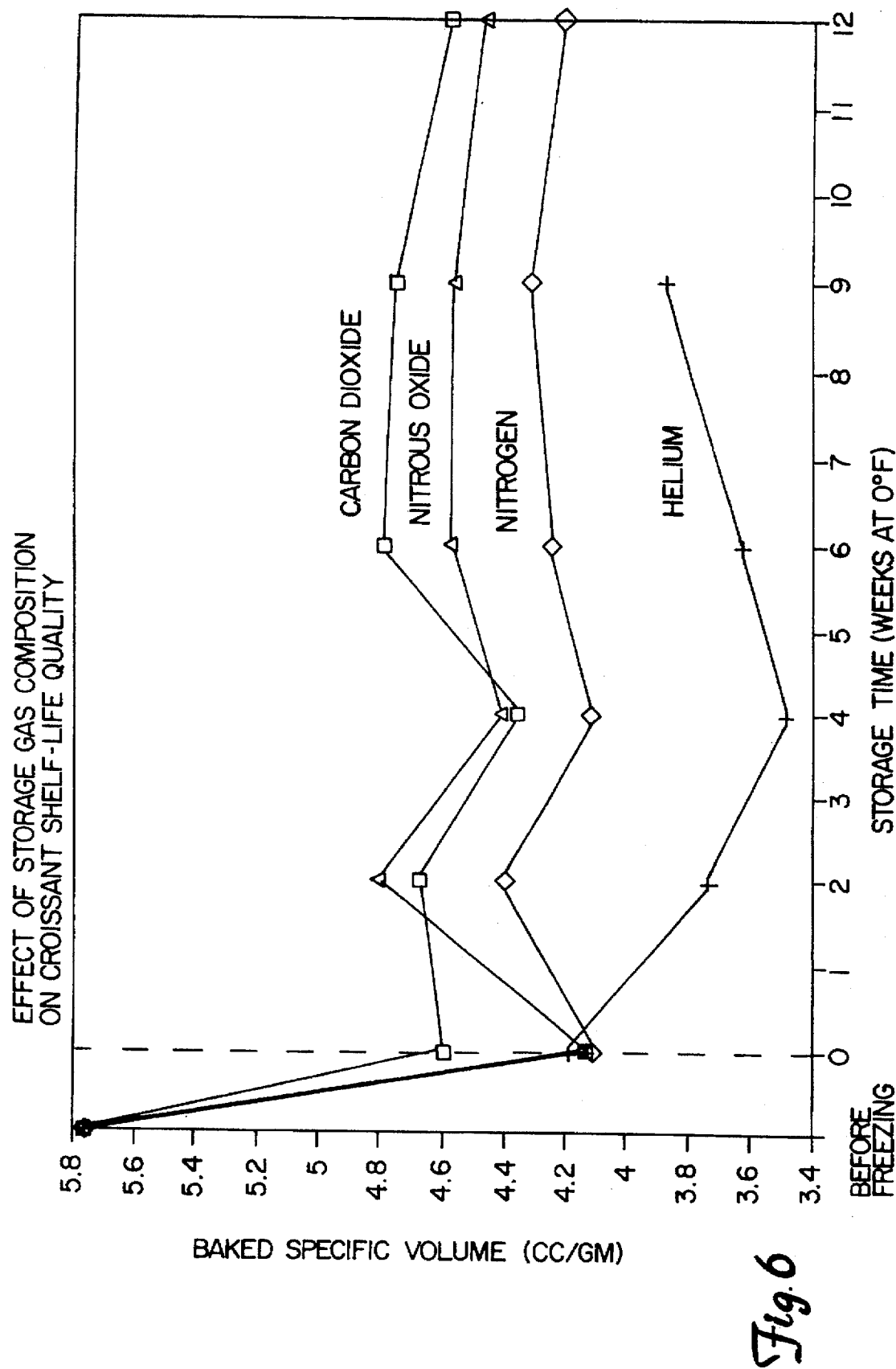
FIG. 6 is a graph showing functional relationships between baked specific volume and storage times with the gaseous environment containing different gases.
Figure 7:
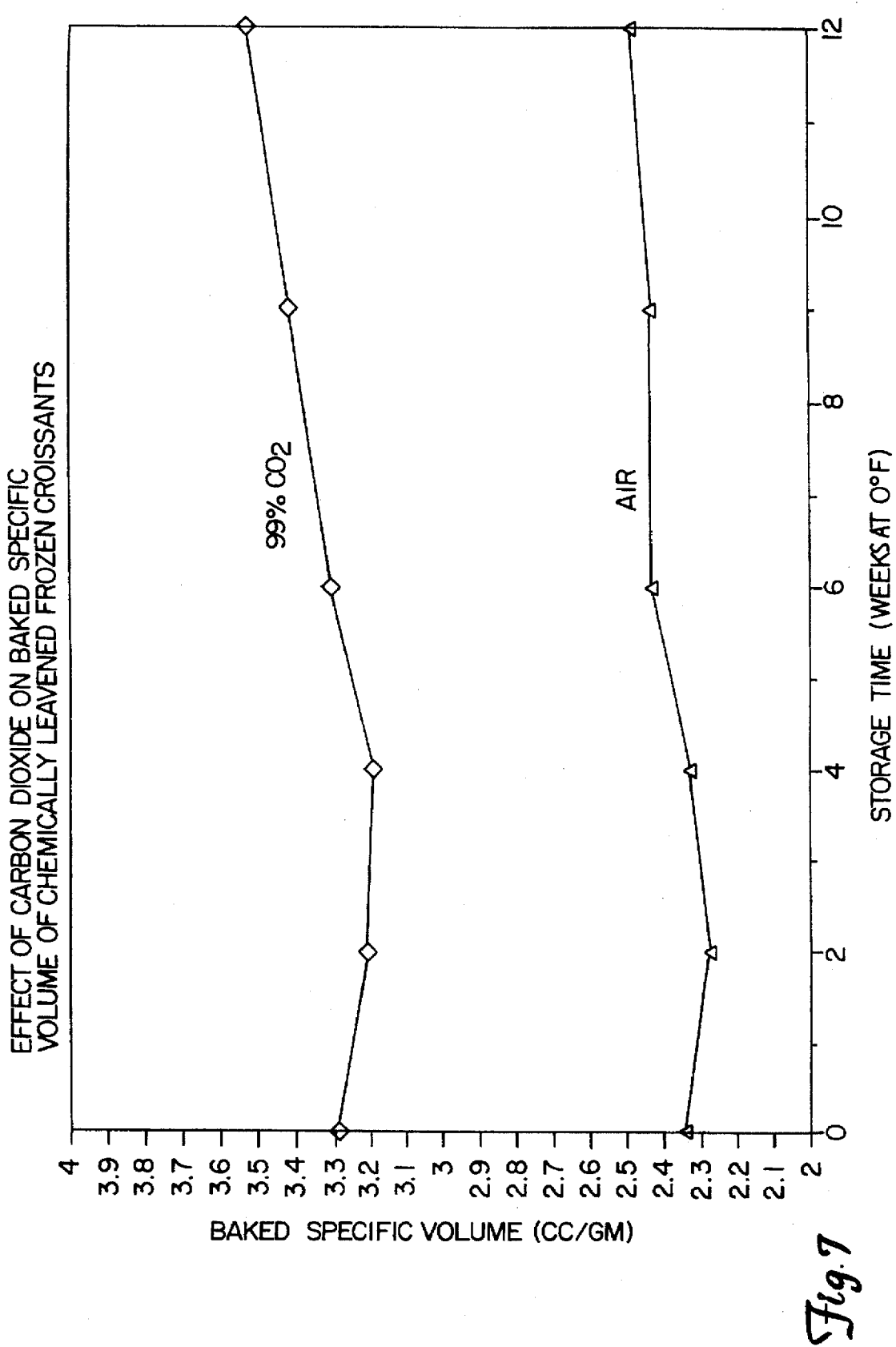
FIG. 7 is a graph showing functional relationships between baked specific volume and storage times for chemically-leavened croissants with the gaseous environment being carbon dioxide or air.

The effects of gas composition on the baked specific volume of the croissants throughout storage are shown in FIG. 6. The croissants packed in atmospheres of either carbon dioxide or nitrous oxide gases maintained their specific volume and eating quality. These unexpected observations may be due to the high solubility of carbon dioxide and nitrous oxide in water relative to the other gases. (International Critical Tables, McGraw Hill, Vol. 3, pp. 255–260, 1928).

EXAMPLE III

Yeast Leavened Bread

This example demonstrated the effects of ethanol and glycerol in doughs packaged in a carbon dioxide environment during 12 weeks of shelf life frozen at +10° F. The doughs were prepared in accordance with the following formula.

TABLE III

| | |
|---|---|
| Flour | 59.0% |
| hard wheat, high gluten enriched | |
| Water | 33.6% |
| Alcohol/Polyol | 2.0% |
| Ethanol or Glycerol | |
| Salt | 1.0% |
| Dough Conditioners | 0.4% |
| Shortening | 2.0% |
| Yeast, compressed | 2.0% |

The ingredients were mixed for ten minutes or until a suitable dough was produced. The dough was divided into samples. Some of these samples were sealed in a package and frozen overnight at −10° F. The remaining samples were placed for a few hours in a freezer at −10° F. after which they were placed in a package which then was flushed with carbon dioxide gas. All of the samples were stored at +10° F. after freezing. Samples of the dough were removed at 3 week intervals and baked at 375° F. (approximately 130–160 grams dough per small loaf pan) for approximately 40–45 minutes. The specific volume of the resulting bread products was measured as described in Example 4. The results are shown in FIG. 9 as bars 3–6. Bars 1–2 of FIG. 9 are from the control without ethanol or carbon dioxide. Bars 7–8 are with 4% glucose to determine whether melting point depression accounts for the specific volumes obtained.

EXAMPLE IV

Measuring specific Volume of Bread

The material required for this analysis includes a balance capable of weights up to 500 gm to the nearest gm; a one pound bread volumeter, manufactured by National Manufacturing Corp. of Lincoln, Nebr.; an aluminum scoop, cast size #2; rapeseeds and sieves from Seedburo Equipment Co. of Chicago, Ill. The sieves included a flax sieve, #13 with round perforations, and the Weevil sieve #35 with round perforations. Equipment also included volume standards of 1675 cc, 1000 cc and 400 cc.

The rapeseeds should contain seeds of many different sizes. The size distribution causes variations in the way the seeds pack in the volumeter and around a bread product. To reduce and largely eliminate errors from seeds, the seeds should be sifted through a Seedburo #35 Weevil sieve to remove large seeds and through a Seedburo #13 Flax sieve to remove small seeds.

The bread volumeter is standardized prior to bread testing. The bread volumeter includes a gate and a volume scale. The bread volumeter also includes a meter, an upper chamber and a lower chamber. The upper chamber and lower chamber are separated by a movable gate.

To standardize the bread volumeter, a gate at the bottom of the bottom scale is closed. With the meter in an upright position, the upper chamber is opened and rapeseeds are added until the chamber is about ¾ths full. The upper chamber is then closed and clamped. The lower chamber is opened by unfastening a clamp and inverting the meter. A standard of 1675 cc is inserted into the lower chamber. The lower chamber is closed by returning the meter to an upright position and clamping. The level of rapeseeds is adjusted to be equal with the gate. Seeds are added or removed as necessary. Seeds are then returned to the upper chamber, the gate is closed, and the volume standard is removed.

To determine specific volume of a bread sample, a bread product is allowed to cool one hour after baking. The bread sample is weighed to the nearest gram and the weight is recorded. The sample is placed in the lower chamber of the bread volumeter. For bread samples in a range of 0–1325 cc, the 1675 cc standard is included in the chamber. For bread samples in the volume range of 700 to 2000 cc, the 1000 cc standard is included in the chamber. For samples in the 1700–3000 cc range, no standard is required. Once the bread sample is positioned in the lower chamber, the gate is opened. The meter is not tapped. The level of seeds is determined and recorded. This level is designated as "V." The seeds are then returned to the upper chamber of the bread volumeter, the gate is closed and the sample is removed. The specific volume in cc per gram is equal to the volume of seeds displaced (cc) minus the volume of standard in cc's (0 if no standard was used). This difference is divided by the weight of the sample in grams. The test was performed in triplicate and a loaf of bread with a volume of about 1000 cc and an average specific volume of 4.04 cc per gm. This analysis yielded a standard deviation of 0.10 cc per gram.

The foregoing description of the specific embodiments revealed the general nature of the present invention so that others can, by applying current knowledge, readily modify and/or adapt the invention for various applications. It is to be understood that the phraseology or terminology employed herein is for the purpose of description and not of limitation. The invention is not limited by the specific disclosures herein, except to the extent that such limitations are found in the claims.

What is claimed is:

1. A method for making a baked bread from a dough that has been frozen, the baked bread having a specific volume substantially the same as bread made from a dough that has not been frozen, the method comprising:

preparing a dough containing at least flour and water and sufficient leavening as to provide a specific volume at a storage temperature in excess of between about 1 to 2 cc's per gram;

adding to said dough ethanol in an amount within a range of between about 0.5% and about 5% by weight of said dough;

storing the dough in a container at a temperature being less than about 45° F. (7° C.) with said dough product therein, thereby freezing the dough, said container having a volume of at least equal to the volume of said dough product and wherein the container volume in excess of the dough product contains at least about 50% by volume of carbon dioxide gas;

baking the dough that has been frozen to form a baked dough product with a specific volume at least about 36 percent greater than a specific volume of unbaked dough.

2. A method of maximizing specific volume in a bread baked from dough that has been frozen, the dough having a matrix of gas cells defined by the dough, comprising:

preparing the dough so that the dough includes a water component;

adding a quantity of ethanol to the dough in a concentration effective to solubilize a protein fraction of the dough defining the gas cells, thereby permitting the gas cells to expand;

confining the dough to a container capable of holding a pressure head;

adding a quantity of carbon dioxide to the container in an amount effective to reduce an escape of carbon dioxide from the gas cells of the dough when the water in the dough freezes;

freezing the dough; and baking the dough that has been frozen to form a baked dough product having a specific volume at least about 36 percent greater than a specific volume of unbaked dough.

3. A system for maintaining dough structure during cold storage, within a temperature range that is less than 45° F. (7° C.), comprising:

a dough structure having as cells with radii defined by the dough;

an adjuvant in a concentration effective to adjust surface tension of dough defining the gas cells so that a ratio of surface tension to gas cell radius equals gas cell pressure of a magnitude to produce a dough specific volume of at least about 1.0 to 2.0 cubic centimeters per gram of dough;

a quantity of carbon dioxide effective to maintain dissolved carbon dioxide in the dough; and a container for containing the dough structure, the adjuvant and the carbon dioxide.

4. The system of claim 3 wherein the adjuvant is selected from a group comprising an alcohol and a polyol.

5. A system of claim 3 wherein the carbon dioxide .concentration is at least about 95% by volume of the container.

6. The system of claim 4 wherein the alcohol is ethanol.

7. The system of claim 4 wherein the polyol is glycerol.

* * * * *

UNITED STATES PATENT AND TRADEMARK OFFICE
CERTIFICATE OF CORRECTION

PATENT NO. : 5,672,369
DATED : September 30, 1997
INVENTOR(S) : Dennis A. Lonergan, et al.

It is certified that error appears in the above-indentified patent and that said Letters Patent is hereby corrected as shown below:

Column 2, Line 44, replace the comma with a period.

Column 2, Line 46, replace the comma with a period.

Column 10, Line 17, delete " 7+ " and replace with -- 7° --.

Column 11, Line 36, delete "specific" and replace with --Specific--.

Column 14, Line 16, delete ".concentration" and replace with --concentration--.

Column 7, Line 59, delete "19,880" and replace with "19.880".

Signed and Sealed this

Twentieth Day of January, 1998

Attest:

BRUCE LEHMAN

*Attesting Officer*  *Commissioner of Patents and Trademarks*